Feb. 5, 1924.
L. P. BONIER
1,483,040
COMBINED RECEPTACLE AND CUTTING BOARD
Filed April 8, 1922
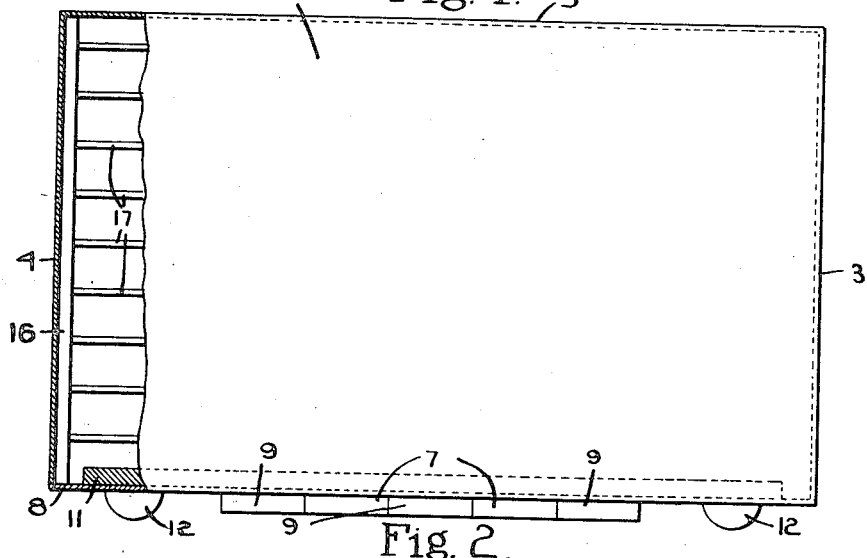
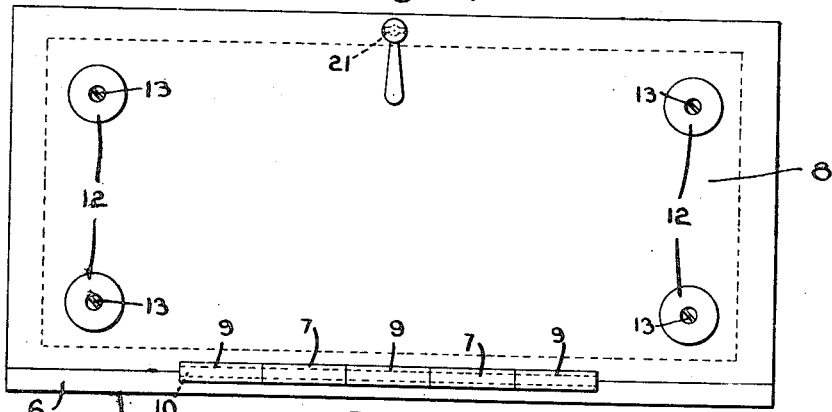
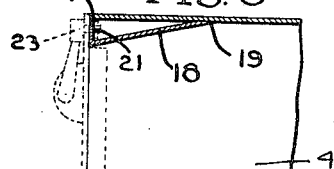
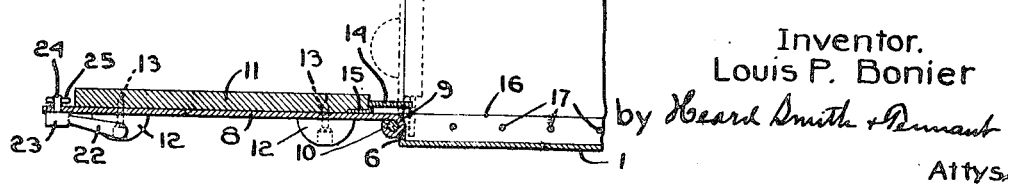
Inventor.
Louis P. Bonier
by Heard Smith & Tennant
Attys.

Patented Feb. 5, 1924.

1,483,040

UNITED STATES PATENT OFFICE.

LOUIS P. BONIER, OF WOONSOCKET, RHODE ISLAND.

COMBINED RECEPTACLE AND CUTTING BOARD.

Application filed April 8, 1922. Serial No. 550,706.

*To all whom it may concern:*

Be it known that I, LOUIS P. BONIER, a citizen of the United States, and resident of Woonsocket, county of Providence, State of Rhode Island, have invented an Improvement in Combined Receptacles and Cutting Boards, of which the following description, in connection with the accompanying drawing, is a specification, like characters on the drawing representing like parts.

This invention relates to improvements in receptacles, particularly such as are adapted to receive bread and articles of pastry, and the principal object of the invention is to provide a receptacle of this character with a closure having an interior surface of fibrous material adapted to be used as a cutting board upon which the bread or other material may be cut into slices.

A further object of the invention is to provide a novel means for supporting the door with its cutting board when in open position.

A further object of the invention is to provide means for deflecting the crumbs resting upon the cutting board into the interior of the receptacle when the cutting board supporting door is closed.

A further object of the invention is to provide a novel means for hinging the door to the receptacle.

A further feature of the invention consists in providing a removable grid for supporting the articles in the receptacle out of contact with the base thereof in order that any condensation of moisture upon the bottom of the receptacle will not be absorbed by the articles contained in the receptacle.

A further object of the invention is to provide novel means for enabling the crumbs to be readily removed from the receptacle.

A further object of the invention is to provide a novel locking device for the door of the receptacle.

Other objects and features of the invention will more fully appear from the following description and the accompanying drawings and will be pointed out in the claims.

A preferred embodiment of the invention is illustrated in the accompanying drawing, in which, Fig. 1 is a plan view of the receptacle, a portion of the top being broken away at one end to show the interior structure of the receptacle and the grid;

Fig. 2 is a front elevation of the receptacle.

Fig. 3 is a detail vertical sectional view of the front portion of the receptacle showing the door upon which the cutting board is secured in open position.

The receptacle, which is illustrated herein as a bread box, desirably is formed of sheet metal of sufficient strength and rigidity to withstand ordinary uses. It preferably is substantially of rectangular form in longitudinal and transverse section and comprises a bottom 1, a top 2, ends 3 and 4, a closed rear side 5 and an open front. The bottom 1 desirably is provided with an upwardly extending flange 6 which extends entirely across the lower portion of the open front. The flange 6 desirably is provided with a plurality of cylindrically curved tabs 7 adapted to form parts of a hinge for a door by which the open front may be closed. The open front is closed by a door which is provided with, or consists of, a plate of fibrous material adapted to be used as a cutting board upon which articles, such as, bread, cake, and the like may be cut into slices. As illustrated herein the door comprises a metallic plate 8, preferably of the same material as that of the body of the receptacle, of suitable form to close completely the open front of the receptacle. Preferably the metallic plate 8 is provided with a plurality of cylindrically formed tabs 9 complementary to the tabs 7 of the flange 6 and adapted to alternate therewith. A pintle 10, inserted through the cylindrical tabs 7 and 9, serves to complete the hinge for pivotally securing the door to the flange 6.

The cutting board desirably is in the form of a plate or slab 11 of wood or other fibrous material which is of somewhat smaller area than that of the door 8 and is secured to the inner face thereof in any suitable manner. As illustrated herein a plurality of standards or cushions 12 are provided to support the door when in open position upon the base upon which the receptable rests. These standards or cushions, which desirably may be of rubber, are secured to the door by screws 13 which pass through the metal plate 8 of the door and anchor in the cutting board 11. The screws thus serve the double purpose of securing the standards to the door and also of securing the cutting board to the door.

When it is desired to cut the bread, cake, or other article which is normally contained within the receptacle, it is merely necessary to swing the door to horizontal position, as illustrated in Fig. 3, so that the standards 12 will rest upon the same base as that which supports the bottom of the receptacle. The bread or other article may then be removed from the receptacle, placed upon the cutting board and sliced thereon. When this has been accomplished and the slices removed the remainder of the loaf may be replaced in the receptacle.

Another feature of the invention consists in providing means for delivering the crumbs which are deposited during the slicing operation upon the cutting board, into the receptacle when the door is closed. As illustrated herein this is accomplished by providing an angularly bent plate, the body portion 14 of which is flush with the surface of the cutting board, and the offset portion 15 of which extends into a recess in the edge portion of the cutting board which is most nearly adjacent the hinge. The body portion 14 of this deflecting plate extends a sufficient distance into the receptacle, when the door is in horizontal position, to prevent any of the crumbs from falling upon the hinge or upon the base upon which the door rests. When the door is swung to closed position, illustrated in Fig. 3, the deflector 14 assumes a vertical position so that the crumbs are guided into the bottom portion of the receptacle.

Preferably a grid is provided to support the bread or other articles from contact with the bottom so that they will not absorb any moisture which may condense upon the inner surface of the bottom of the receptacle. A convenient form of grid comprises bars 16 which may extend throughout the depth of the receptacle, these bars having apertures or sockets for a series of rods 17 upon which the articles may be placed.

In order to enable the crumbs to be readily removed from the receptacle and also to provide a convenient means for locking the door of the receptacle, the top 2 is provided near its front end with an inclined flanged guide 18, the rear edge 19 of which is beveled and secured to the top 2 in such a manner as to provide a substantially continuous surface. The forward edge of the guide 18 is provided with a flange 20 which extends throughout the width of the receptacle and is secured to the top 2 by solder, or other suitable fastening. The flange 20 desirably is provided centrally with a slot 21 through which the keeper of a suitable locking device may be inserted when in alinement with the slot and thereafter turned in such a manner as to prevent removal of the keeper. As illustrated herein the locking device carried by the door comprises a lever 22 having a head 23 provided with a stem 24 having a suitable retaining member adapted to pass through the slot 21. As illustrated herein a pin 25 extends through and is secured to the stem 24 in such a manner that its ends project a short distance beyond the stem. This key is adapted to pass through the slot 21 when the handle is moved to horizontal position and to lie at right angles to the slot 21 when the handle is in vertical position as illustrated in Figs. 2 and 3. By reason of this construction the door can be readily closed by means of the handle and locked, or when it is desired to open the receptacle the handle may be swung into substantially horizontal position so that the pin 25 will pass through the slot 21 and the door then swung into horizontal position as illustrated in Fig. 3. The handle desirably is so constructed as to lie close to the outside of the door so that when in horizontal position it will not rest upon the base upon which the door is supported.

When it is desired to remove the crumbs from the receptacle the grid is removed, the door closed and the receptacle inverted, that is, so that its top will rest upon the base. The crumbs will thereupon fall down upon the top. The door may then be opened and the crumbs readily scraped from the top across the guide 18 into a suitable pan or tray since the merging of the guide 18 into the top 2 will present no ridge which will obstruct the removal of the crumbs.

It will be understood that the embodiment of the invention disclosed herein is of an illustrative character and is not restrictive and that various changes may be made within the spirit and scope of the following claims.

Having thus described my invention, what I claim as new, and desire to secure by Letters Patent, is:

1. A sheet metal receptacle comprising a body, a door hinged to said body adjacent to the bottom thereof having a plate of fibrous material secured to the inner face thereof to provide a cutting board and a plurality of standards secured to said door for supporting said door upon the base upon which the receptacle rests, to prevent strain upon the hinge when cutting is done upon said cutting board.

2. A sheet metal receptacle comprising a body, a door hinged to said body adjacent to the bottom thereof having a plate of fibrous material secured to the inner face thereof to provide a cutting board, standards for supporting the door upon the base upon which the receptacle rests to prevent strain upon the hinge when cutting is done upon the cutting board and means acting to secure said standards to said door and also to secure the cutting board to said door.

3. A sheet metal receptacle comprising a body, a door hinged to said body adjacent to the bottom thereof having a plate of fibrous material secured to the inner face thereof to provide a cutting board, and a crumb deflector secured to said door extending over the hinged edge of said door into the receptacle adapted to cause crumbs to be deposited within the receptacle when the door is closed.

4. A sheet metal receptacle having a bottom, ends, one closed side and an open front, a narrow flange on said bottom extending upwardly across the lower portion of the open front, a door hinged to said flange having a cutting board of fibrous material secured to its inner face and a flanged inclined guide having one edge merging into the forward portion of the top and extending to the front thereof to provide a smooth surface for the discharge of crumbs when the receptacle is inverted.

5. A sheet metal receptacle having a bottom, ends, one closed side and an open front, a narrow flange on said bottom extending upwardly across the lower portion of the open front, a door hinged to said flange having a cutting board of fibrous material secured to its inner face, a flanged inclined guide extending from the forward portion of the top to the front thereof and cooperating releasable interlocking means on said door and the flange of said guide.

6. A sheet metal receptacle having a bottom, ends, one closed side and an open front, a narrow flange on said bottom extending upwardly across the lower portion of the open front, a door hinged to said flange having a cutting board of fibrous material secured to its inner face, a flanged inclined guide extending from the forward portion of the top to the front thereof, a slot in said flange and a pivotally mounted locking member on said door adapted to be passed through said slot when in alinement therewith and to be turned thereafter to lock said door in closed position.

In testimony whereof, I have signed my name to this specification.

LOUIS P. BONIER.